United States Patent [19]

Alives Porta

[11] Patent Number: 5,783,137
[45] Date of Patent: Jul. 21, 1998

[54] PROCESS FOR THREE DIMENSIONAL FORMING OF A FABRIC

[76] Inventor: Miguel Alives Porta, Avda. Castellmar 5, 08360-Canet De Mar (Barcelona), Spain

[21] Appl. No.: 558,854

[22] Filed: Nov. 16, 1995

[30] Foreign Application Priority Data

Dec. 2, 1994 [ES] Spain .................. 9402479

[51] Int. Cl.$^6$ .................................. B29C 59/02
[52] U.S. Cl. .................... 264/510; 264/132; 264/134; 264/293; 264/322; 156/219; 156/220; 156/232; 156/234; 156/240; 427/146; 427/147; 528/481; 528/502 R; 528/502 C
[58] Field of Search ................. 264/510, 132, 264/134, 293, 322; 156/219, 220, 232, 234, 240; 427/146, 147; 528/481, 502 R, 502 C; 428/195

[56] References Cited

U.S. PATENT DOCUMENTS

| | | |
|---|---|---|
| 2,234,839 | 3/1941 | Edwards . |
| 4,042,433 | 8/1977 | Hardy et al. . |
| 4,631,210 | 12/1986 | McGee et al. . |
| 5,087,311 | 2/1992 | Elliott et al. .................. 156/212 |
| 5,599,416 | 2/1997 | Kuwahara .................... 156/219 |

FOREIGN PATENT DOCUMENTS

| | | |
|---|---|---|
| 1 327 213 | 2/1977 | France . |
| 2 051 653 | 1/1981 | United Kingdom . |
| 2 094 701 | 9/1982 | United Kingdom . |
| WO 86/07005 | 12/1986 | WIPO . |
| WO 93/09930 | 5/1993 | WIPO . |

*Primary Examiner*—Fred Teskin
*Attorney, Agent, or Firm*—Sughrue, Mion, Zinn, Macpeak & Seas, PLLC

[57] ABSTRACT

The invention relates to a process and an arrangement for the three-dimensional forming of a fabric. The process comprises the steps of providing a countermold; preparing a complex sheet by superimposing a sheet of plastics, hot-melt material and a fabric; die-cutting the complex sheet; superimposing the die cut complex sheet over the fabric; attachment of the die cut complex sheet to the fabric by pressing and heating until the fabric is impregnated by melting of the hot-melt material; and application of the ensemble of the complex sheet and fabric to the countermold by blowing pressurized air. The arrangement comprises a frame receiving the fabric to be formed and which is movable through various workstations wherein the process steps take place.

7 Claims, 5 Drawing Sheets

PROCESS FOR THREE DIMENSIONAL FORMING OF A FABRIC

DESCRIPTION

1. Field of the Invention

The invention relates to a process and arrangement for three dimensional forming of a fabric, particularly a fabric constituting a readymade garment having an outer surface and an inner surface, said forming being effected in at least a first flat area of the fabric defining a first perimeter.

2. Description of the Prior Art

Nowadays, fabrics are frequently printed on, with a view to obtaining garments having different motifs or representations, which may be made for advertising purposes, to personalize the garment or simply to give it an attractive appearance.

Other techniques are also used to achieve the incorporation of designs on fabrics, such as the use of transfers or flocking, which consists of applying different products which react together and form a substantially uniformly thick layer having a small maximum thickness of around 2 millimeters.

A peculiarity of these known techniques is that the design obtained is flat, i.e., it does not define any particular form, but adapts itself to the form of the fabric at any one time. Therefore, due to the large amount of existing models, they arouse slight interest on the market and lose a large part of their function, particularly when they are directed to advertising purposes.

There are reports of attempts to form fabrics in relief, but unsatisfactory results have been obtained in these known attempts, which also have the drawback of being substantially manual.

SUMMARY OF THE INVENTION

It is an object of the invention to overcome this situation. This object is achieved by a process of the type mentioned at the beginning which is characterized in that it comprises the following steps: (a) providing a countermold of said form; (b) preparing a complex sheet, comprising a sheet of plastics material, a sheet of fabric and a hot-melting material; (c) die cutting said complex sheet, conferring thereon dimensions resulting from enlarging said first area with a wide edge surrounding said first perimeter; (d) superimposing said die cut complex sheet on the inner surface of said fabric, in a position in which said wide edge, from said first perimeter, extends outwardly from said first area; (e) attachment of said die cut complex sheet to said fabric, by pressing and heating until said fabric is impregnated by melting of said hot melt material; and (f) application of the ensemble formed by the complex sheet and the fabric to said countermold and simultaneous cooling, by blowing pressurized air.

In turn, the arrangement of this invention is characterized in that it comprises: (i) at least one movable bottomless frame having a lateral support structure, an upper plate supported by said lateral structure and a window formed in said upper plate; (ii) at least one first workstation which may be occupied by said frame and where there are first means for indicating the position of said first flat area of the fabric relative to said window; (iii) at least one second workstation, which may be occupied by said frame coming from said first area, for receiving complex sheets, each of which is formed by a sheet of plastics material, a textile sheet and a hot-melt material, and is die cut with dimensions resulting from enlarging said first area with a wide edge surrounding said first perimeter; there being situated in said second workstation coincidence means for placing a die cut complex sheet on the inner surface of said fabric, said placing leading to a position of the complex sheet in which said wide edge, from said first perimeter, extends outwardly from said first area; (iv) at least one third workstation, which may be occupied by said frame coming from said second workstation, and in which there is pressing and heating means for strongly pressing the die cut complex sheet against said first area of the fabric and for heating the complex sheet; (v) a countermold of said three dimensional form having an open end defining a contour line, the surface immediately adjacent said contour line being flat; and (vi) at least one fourth workstation, which may be occupied by said frame coming from said third workstation and where there are: (a) a raising means for raising said countermold until it is applicable against said outer surface of the fabric, so that said contour line coincides substantially with said first perimeter of said first area; and (b) a blower means having a plate applicable to said inner surface of said fabric, trapping said wide edge together with said countermold, said plate having at least one pressurized air passage suitable for causing forming of the fabric and of the complex sheet by application thereof against said countermold.

BRIEF DESCRIPTION OF THE DRAWINGS

Further advantages and features of the invention will be appreciated from the following description, in which there is given a preferred non-limiting embodiment of the invention, with reference to the accompanying drawings, in which.

DETAILED DESCRIPTION OF THE INVENTION

Although the word fabric will preferably be used hereinafter, it must be understood that the preferred case in which the fabric is that of a readymade garment is also designated by this word.

The process for three-dimensionally forming a fabric of the present invention requires that the fabric to be formed be subjected to prior operations to the forming operation. These prior operations may be performed in different ways belonging substantially to the prior art, whereby the reference thereto herein is not extensive.

One of the ways of performing these operations is as follows: a three dimensional embodiment of the object to be formed into the fabric is obtained; this three dimensional embodiment is drawn and coloured appropriately; thereafter a countermold is prepared and a sheet is pressed thereagainst so as provisionally to adopt this three dimensional form; the countermold will be used again as described later on.

The provisionally formed sheet is drawn and coloured in a similar way as mentioned above; subsequently it is flattened, whereby there is obviously obtained a flat representation corresponding to the object it is desired to form. This flat representation has the actual dimensions that must be printed on the fabric, so that the three dimensional forming to be effected will not be deformed or be incorrectly centered. These dimensions may be obtained by other processes, some of which are computer processes. As will be discussed later on, these dimensions are the ones determining the perimeter of the first flat area to be formed.

Independently of the above, a complex sheet is prepared, constituted by: a sheet of plastics material, preferably PVC; a textile sheet which is preferably of the same material as the fabric to be formed and a hot melt material, preferably a plastisol, placed between the other two items. This complex sheet is die cut to produce a plurality of pieces, each of which has dimensions resulting from amplifying those of the first flat area to be formed with a wide edge surrounding the perimeter of the first area; the width of the edge ranges preferably from 3 to 10 mm. This wide edge serves two purposes; one of them is to act as protection, since when the formed garment is being worn, it prevents the edges of the plastics material (PVC) from touching the wearer's body; on the other hand, as described later on, during the blowing step it allows an airtight seal to be obtained, preventing undesirable air leaks.

Figure 1:
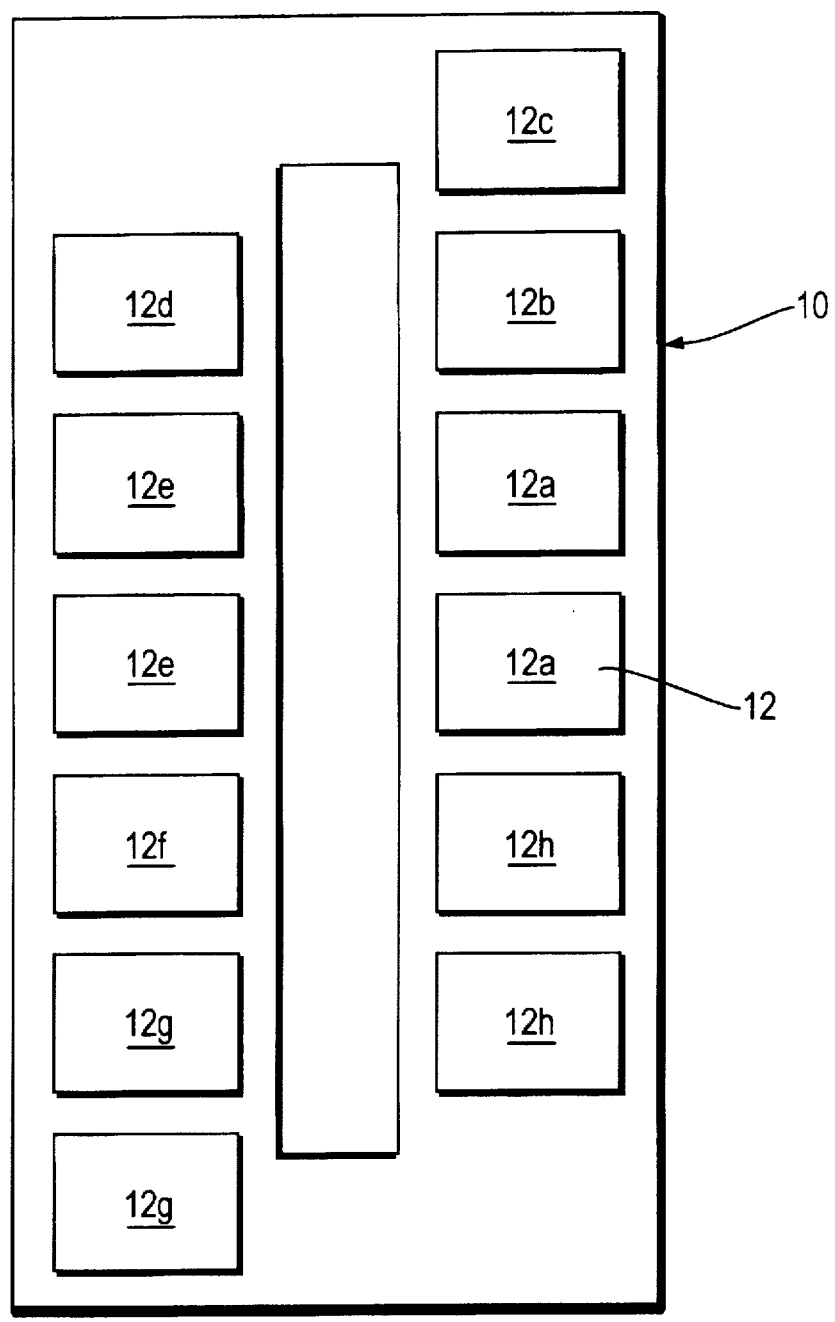
FIG. 1 is a schematic plan view of the structure of an arrangement in which the various workstations at which the process steps take place are located.
Figure 2:
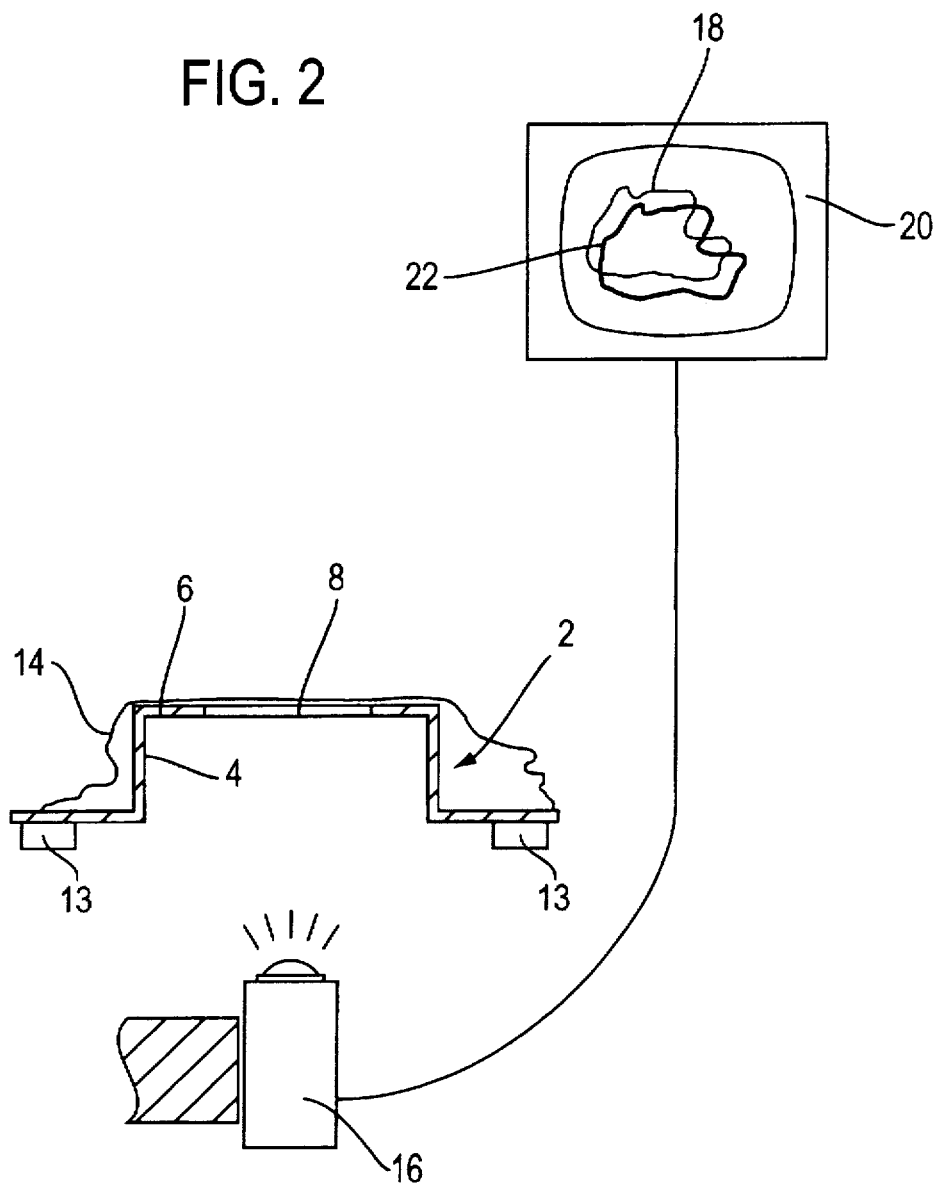
FIG. 2 is a schematic elevation view of a first workstation, where the loading and centering of the fabric in the frame takes place.

To facilitate the successive steps of the present process, it is preferred to have frames 2 provided with a lateral support structure on which an upper plate 6 rests. This plate 6 is provided with a window 8, the dimensions of which are sufficient to be able to frame the first area to be formed. The frame 2 has no bottom, for a purpose to be described later on. These frames are also preferably movable in an arrangement having a structure 10, successively occupying workstations 12 and there are preferably means facilitating the simultaneous passage of the frames 2 from one workstation 12 to the adjacent workstation, completing a closed circuit as seen in FIG. 1.

The static arrangement of these workstations allows the frame to occupy always the same position in any one of them, so that it is also at all times always in the same relative position with regard to the various elements associated with each workstation. Conventional feet 13, associated with complementary means at each workstation, facilitate the said constant relationship.

It is contemplated that there should be two loading stations 12 for manual insertion of the fabric 14 on a frame 2, so that the outer surface thereof is situated downwardly. It is very desirable that these fabrics or garments be situated in an appropriate position on the frame 2 and that this position be held. From here it is also achieved that the fabric 14 is always in one same constant relative position, in the sense expressed in the foregoing paragraph.

One of the systems contemplated for an appropriate location of the fabric 14 on the frame 2 is a camera 16 which takes pictures of the window 8, as well as of the fabric 14 placed thereon. In particular, the camera picks up the image 18 of the first area and transmits it to a monitor 20, where a reference image 22, corresponding to the appropriate position of the fabric, has been previously set. The operative who has loaded the fabric 14 on the frame 2 makes the necessary movements until the images 18 and 22 coincide. At this time, the piece 14 is fixed in place, for example by adhesives, on the edges of the upper plate 6. After this operation, which may be called centering, the frame 2 moves from the first workstation to a second workstation.

Figure 3:
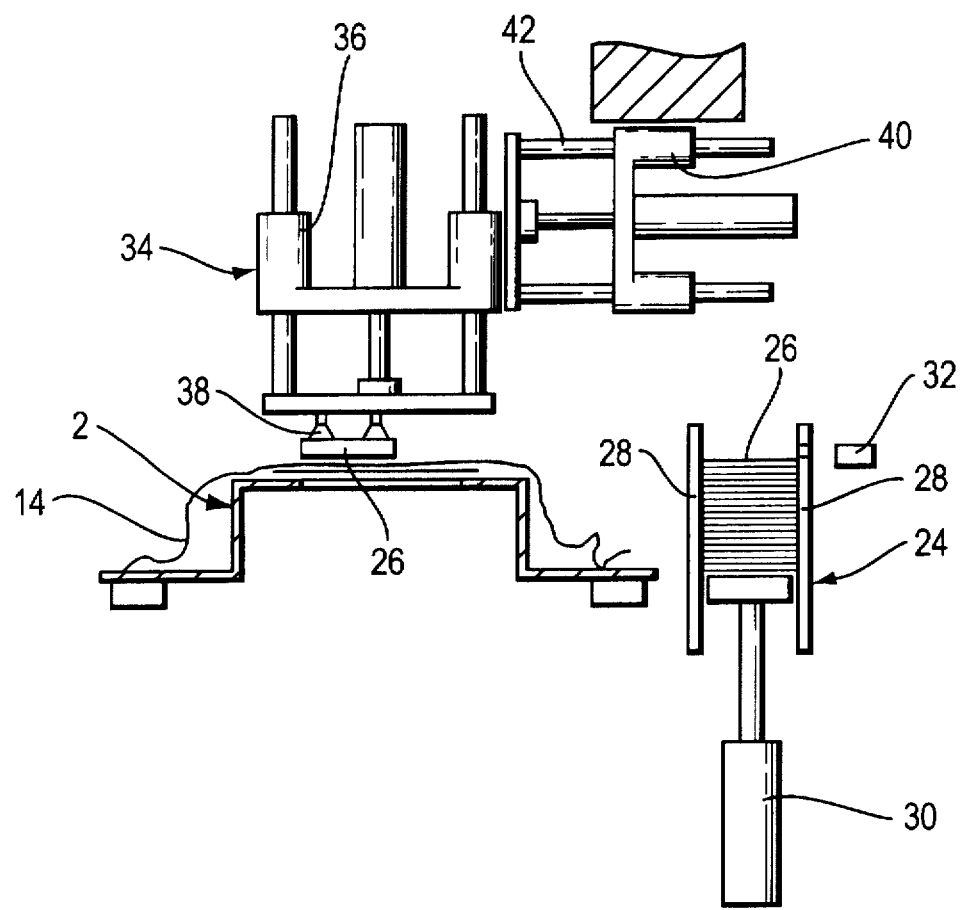
FIG. 3 is a schematic elevation view of a second workstation, where the die cut complex sheet is incorporated with the fabric.

At the second workstation (FIG. 3), the frame 2 is associated with coincidence means, as indicated hereinbelow. A container 24 for stacking die cut complex sheets 26 is associated with positioning members 28, the arrangement of which around the container depends on the shape of the sheets 26. It is contemplated that the positioning members are vertical rods leading to an effective superpositioning of the various stacked sheets 26. The same position on a vertical axis of the various sheets 26 is thereby assured. A pusher 30 is controlled by the level control 32, whereby the uppermost sheet 26 is always at one same level, independently of the number of stacked sheets.

There is also a pneumatic manipulator 34, having a first member 36, provided with suction ports 38 and a second member 40. The first member 36 may move vertically and the second organ 40 is capable of rotation, as well as of radially extending its arms 42. The connection between both members allows a complex sheet 26 to be picked up by the suction ports and, through an appropriate adjustment of the rotary, radial extension and vertical movements and also the cutting off of the suction, the complex sheet is separated and is therefore correctly deposited on the fabric 14. For an appropriate attachment of the fabric 14 to the complex sheet, a further layer of hot melt material, preferably a plastisol, is applied to the free surface of the sheet of plastics material.

Figure 4:
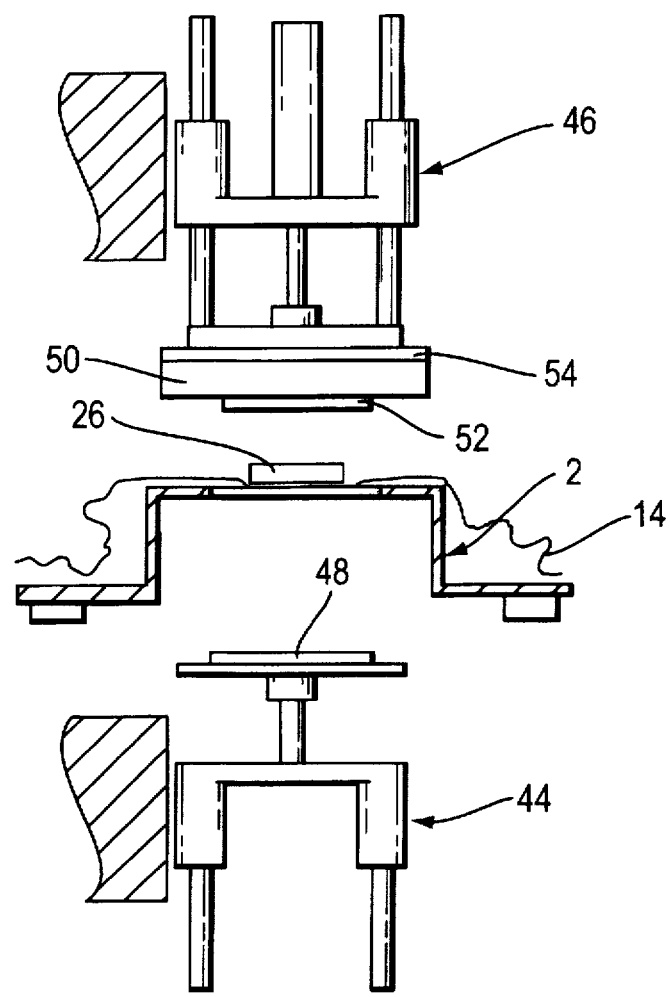
FIG. 4 is a schematic elevation view of a third workstation, where the sheet is heated and pressed against the fabric.

Thereafter, the frame 2 is transferred to a third workstation (FIG. 4) where there is a lower pneumatic means 44 and an upper pneumatic means 46. The former may be raised, whereby a first plate 48 situated upwardly may reach a level at which it is applied to the outer surface of the fabric. The first plate 48 is preferably dimensioned to the same order as the window 8. The upper pneumatic means 44 has a heating plate 50, provided with an electric heating element. Immediately below, there is a second plate which may be lowered to press against the first plate 48 through the fabric 14 and the complex sheet 26. The dimensions of the second plate 52 are substantially the same as those of the die cut complex sheet 26, so as to prevent the fabric 14 surrounding the complex sheet from being touched and negatively affected by heat of the second plate 52. In this way the fabric 14 is attached to the sheet 26 until the fabric is impregnated by melting of the hot melt material. The pressure applied facilitates the impregnation of the fabric with the molten material. Preferably, the heating is effected at a temperature ranging from 180° to 220° C. and the use of an insulation plate 54 to prevent the heat produced by the heating plate 50 from spreading to the means 46 is contemplated. The time required for heating depends, among other factors, on the thickness of the layer of hot-melt material. The time required for the joining step may be longer than the time required for the other steps. Therefore, to avoid delays, it is contemplated that the joining step take place successively in two consecutive third workstations.

Figure 5:
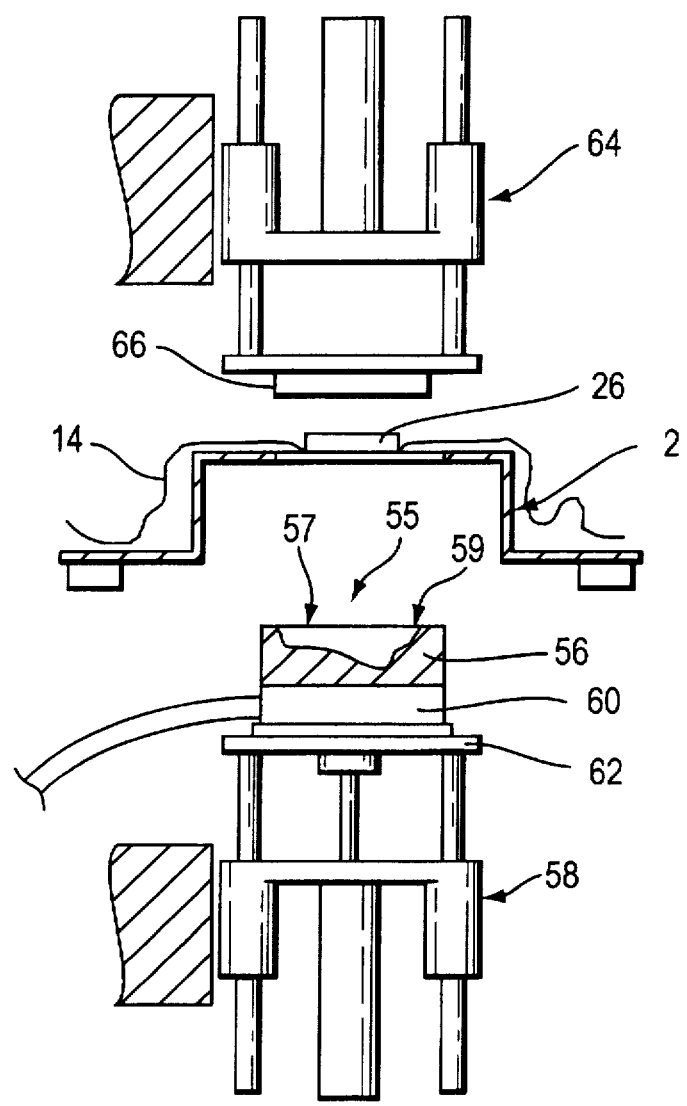
FIG. 5 is a schematic elevation view of a fourth workstation, where the fabric is three-dimensionally formed.

Once the joining is effected, the frame 2 moves to a fourth workstation (FIG. 5), where the countermold 56 is located. This has an open end 55 defined by a contour line 57. It should be pointed out that the surface 59 immediate to the contour line 57 is preferably flat. The countermold 56 is located on a raising means 58 which is suitable to move the countermold into engagement with the outer surface of the fabric 14. The countermold bears against a cooling plate 60 which is in turn on an insulating plate 62. Upwardly, there is an air blower means 64, having a plate 66. When the means 64 is lowered, the plate 66 engages the complex sheet and the pressurized air blown through this plate causes forming of the sheet 26 now attached to the fabric 14, by means of the force applied against the countermold 56. It should be borne in mind that the plate 66 presses the wide edge of the complex sheet 26 against the flat surface 59, forming a seal, and that the centre portion of the sheet 26 yields under the air pressure until it is applied against the countermold. At the same time, the air blown cools the sheet 26, whereby its becomes rigid and takes on its final form. Finally, the frame 2 moves to a discharge station which is preferably located at the same side of the structure 10 of the arrangement according to FIG. 1. In this way, the manual operations take place on one same side of the structure 10, while the automatic process takes place on the opposite side. A preferred form of arrangement of the workstations is the one detailed hereinafter: the workstations 12a are for loading the garment or fabric 14 in the frames 2 of the arrangement; workstation 12b is for the garment or fabric 14 centering operations in the frame 2; workstation 12c, like the workstations 12g are stand-by stations for any changes in the times of the contemplated steps or for inclusion of an additional treatment; the die cut complex sheet 26 is laid over the fabric 14 in workstation 12d; workstations 12e are for the heating and adhesion of the complex sheets 26; workstation 12f is where the forming takes place under the air blast; and finally workstations 12h are for discharging the already formed garment from the frames 2.

What I claim is:

1. A process for three dimensional forming of a fabric having an outer surface and an inner surface, said forming being effected in at least a first flat area of the fabric defining a first perimeter, said process comprising the following steps: (a) providing a countermold of said form; (b) preparing a complex sheet, comprising a sheet of plastics material, a sheet of fabric and a hot-melt material; (c) die cutting said complex sheet, conferring thereon dimensions resulting from enlarging said first area with a wide edge surrounding said first perimeter; (d) superimposing said die cut complex sheet on the inner surface of said fabric, in a position in which said edge, from said first perimeter, extends outwardly from said first area; (e) attachment of said die cut complex sheet to said fabric, by pressing and heating until said fabric is impregnated by melting of said hot melt material; and (f) application of said ensemble of the complex sheet and the fabric to said countermold and simultaneous cooling, by blowing pressurized air.

2. The process of claim 1, wherein said wide edge has a width ranging from 3 to 10 mm.

3. The process of claim 1, wherein said plastics material is PVC and said hot-melt material is a plastisol.

4. The process of claim 1, wherein said heating occurs at a temperature ranging from 180° to 200° C.

5. The process of claim 1, wherein there is used a bottomless frame comprising a lateral support structure supporting an upper plate in which there is a window suitable for framing said die cut complex sheet.

6. The Process of claim 5, comprising a step of placing said fabric on said window of the upper plate in a position in which said first area of the fabric coincides with an optical image.

7. The process of claim 6, using means for removably fixing said fabric in said position of coincidence.

* * * * *